T. E. MAHONEY.
FEEDING DEVICE FOR THRESHING MACHINES.
APPLICATION FILED OCT. 20, 1905.
981,580.
Patented Jan. 10, 1911.
3 SHEETS—SHEET 1.
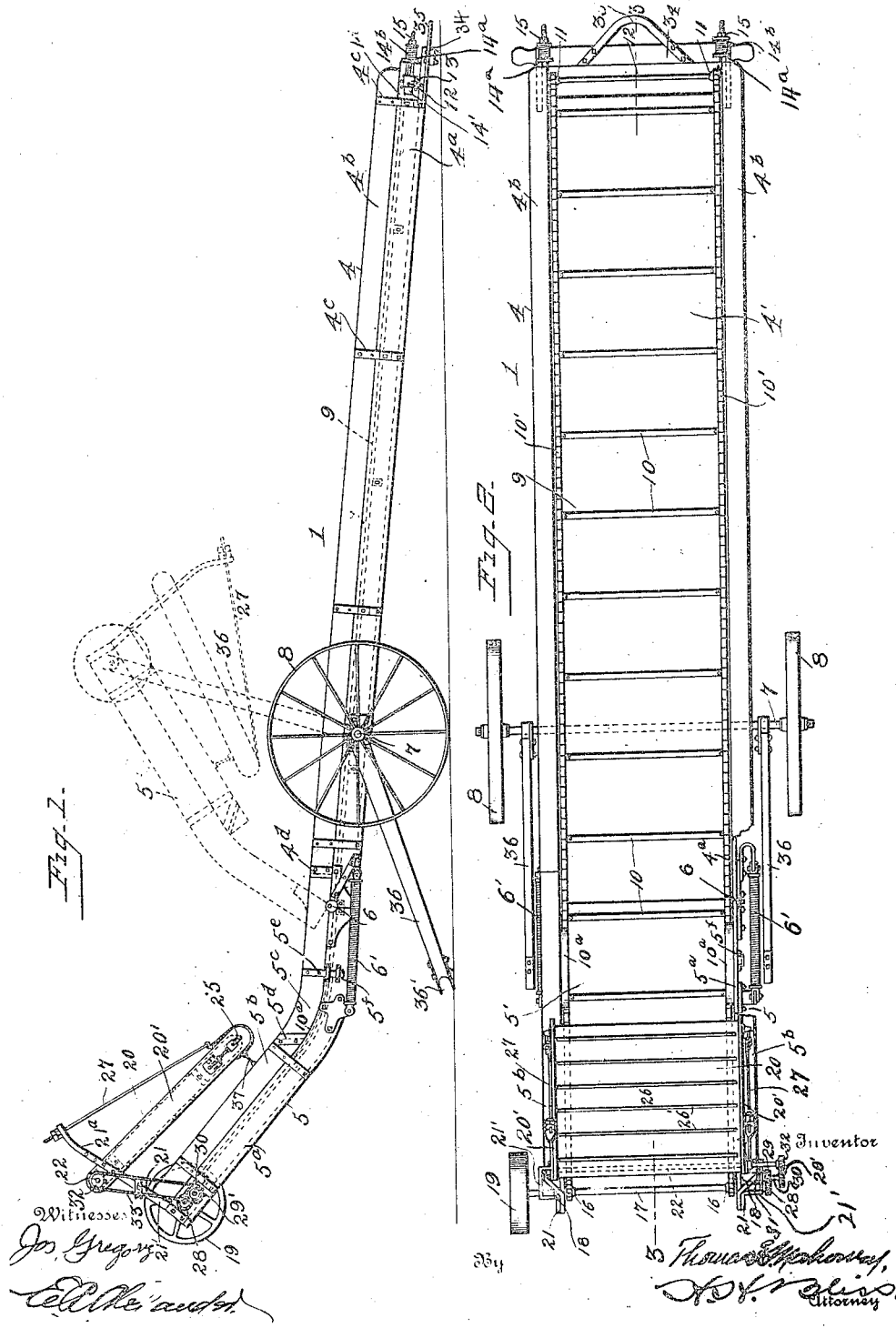

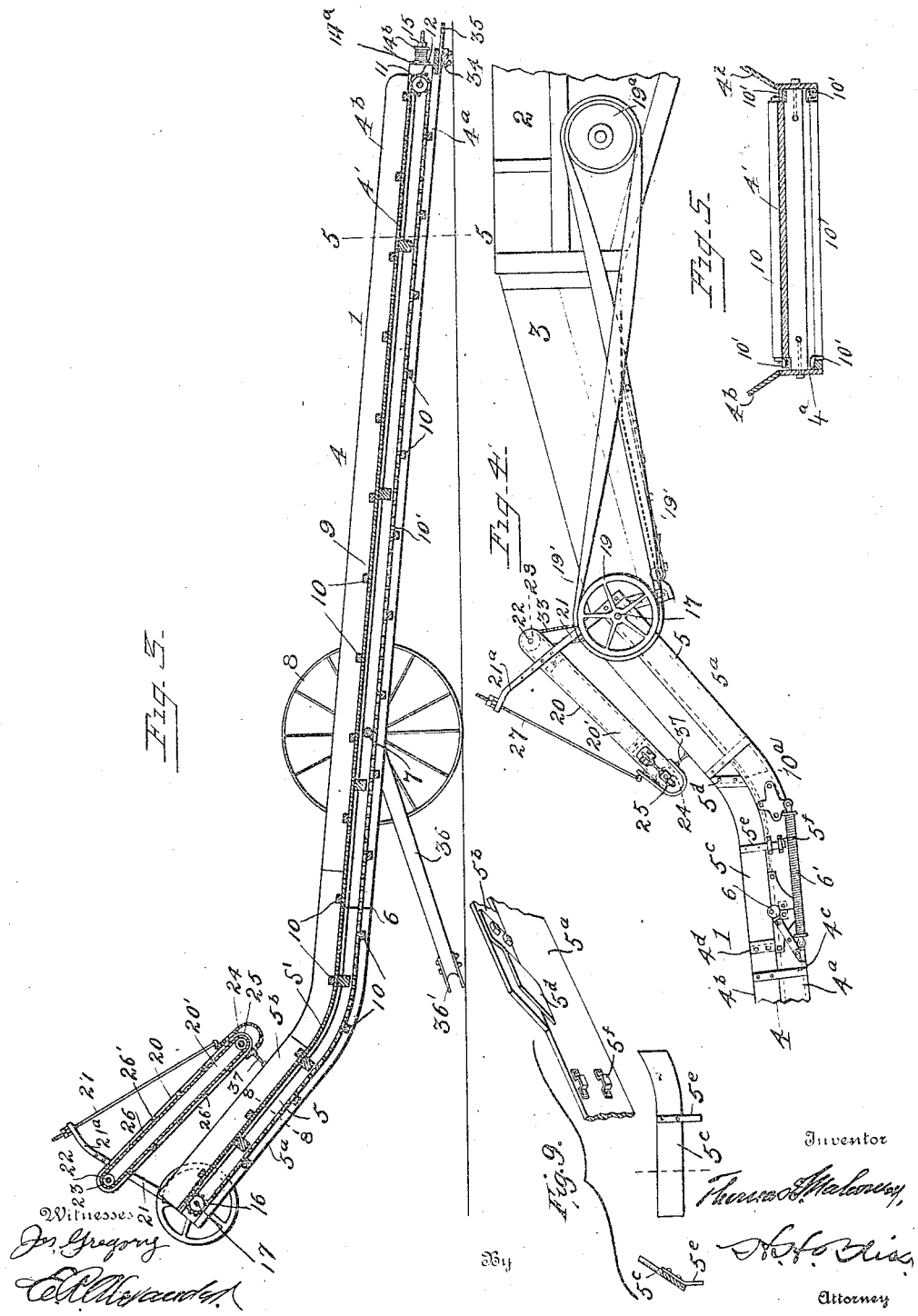

T. E. MAHONEY.
FEEDING DEVICE FOR THRESHING MACHINES.
APPLICATION FILED OCT. 20, 1905.
981,580.
Patented Jan. 10, 1911.
3 SHEETS—SHEET 3.
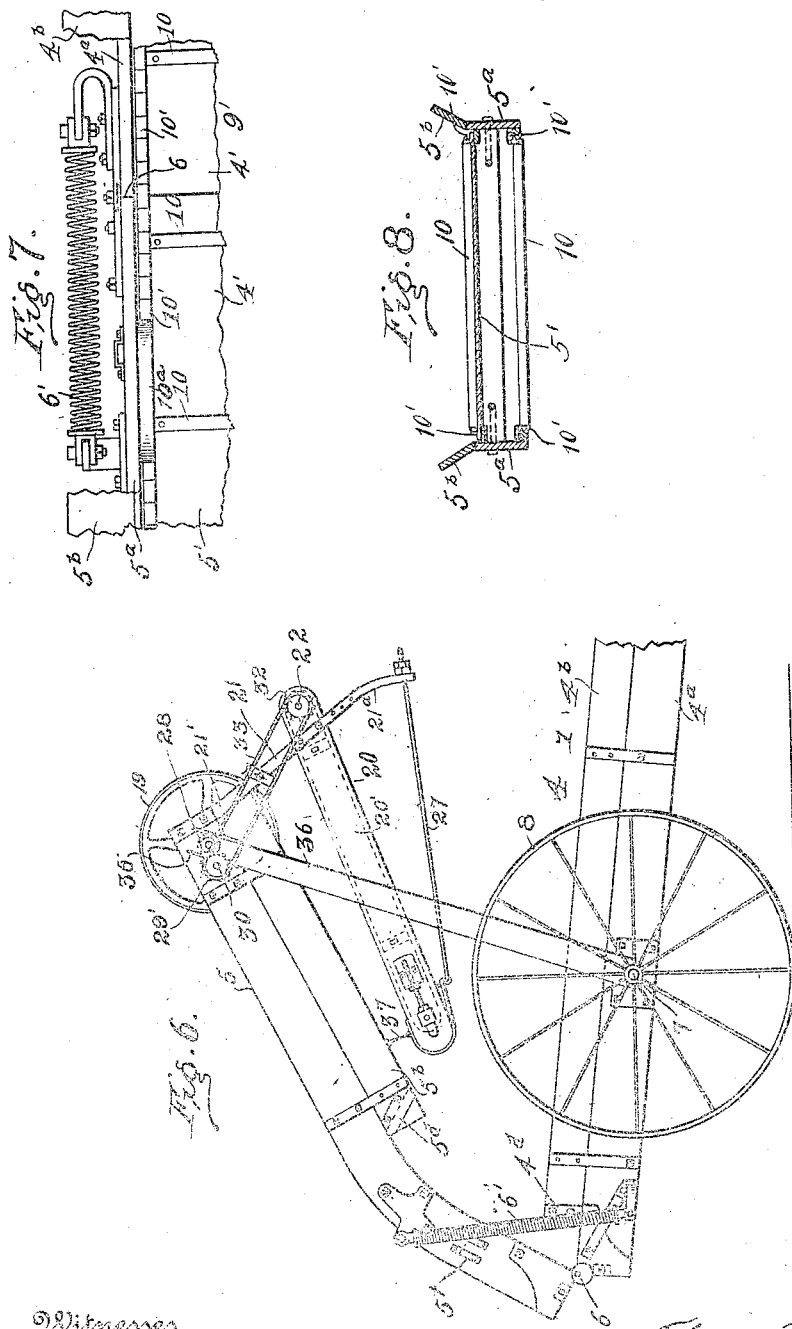

UNITED STATES PATENT OFFICE.

THOMAS E. MAHONEY, OF BUNKER HILL, KANSAS, ASSIGNOR OF ONE-HALF TO JOHN B. BARTHOLOMEW, OF PEORIA, ILLINOIS.

FEEDING DEVICE FOR THRESHING-MACHINES.

981,580.      Specification of Letters Patent.      Patented Jan. 10, 1911.

Application filed October 20, 1905. Serial No. 283,643.

*To all whom it may concern:*

Be it known that I, THOMAS E. MAHONEY, a citizen of the United States, residing at Bunker Hill, in the county of Russell and State of Kansas, have invented certain new and useful Improvements in Feeding Devices for Threshing-Machines, of which the following is a specification, reference being had therein to the accompanying drawing.

This invention relates to an improvement in feeding devices for threshing machines.

It pertains especially to an endless feeder for conducting straw and grain to the band cutting and feeding mechanism on a threshing machine.

One of the objects of my invention is to provide a light feeder which is capable of being folded up to decrease its length when out of operation, and when so folded to be attached to the rear part of the threshing machine and drawn from one place to another thereby. Another object is to so construct the folding portions of the feeder that when its parts are adjusted into operative position the discharge end of the device may be detachably secured to the front elevated end of the band cutting and feeding mechanism on the threshing machine to deliver straw and grain thereto in a stream substantially of uniform thickness.

Other objects and features of my invention will be set forth in the description of the device which, for the purpose of illustration, I have herein shown as embodying my invention.

Figure 1 is a side elevation of a feeder embodying my improvements, with the folded section swung into its operative straw and grain delivering position. Fig. 2 is a top plan view of the same. Fig. 3 is a vertical longitudinal section on the line 3, 3 Fig. 2. Fig. 4 shows in side elevation one of my feeders attached to the front or grain receiving end of the band cutting and feeding mechanism on a threshing machine. Fig. 5 is a section on the line 5—5 Fig. 3. Fig. 6 is a side elevation of a portion of the feeder mechanism showing the sections folded. Fig. 7 is a detail view. Fig. 8 is a section on the line 8—8 Fig. 3. Fig. 9 shows details.

In the drawings 1 indicates, as an entirety, a feeder embodying my improvements. 2 represents a threshing machine, and 3 a band cutting and feeding mechanism carried in the usual manner at the front end thereof.

The feeder 1 preferably consists of two sections, a lower or front one 4 and an upper or rear one 5, which is hinged at 6 to the lower one. This hinge 6 is arranged on a horizontal axis so as to permit the section 5 to be swung backward and forward relative to the section 4. When in its rearmost position relative to the section 4 the section 5 is preferably held by the engagement of the parts of the hinge, or in any other suitable manner, from swinging rearward beyond an inclination of about 45 degrees to the horizontal, and in this position it is also inclined at almost a similar angle to the front section 4. When swung forward the hinge permits the section 5 to swing around said horizontal axis to a point at which the free end of the section 5 overhangs the rear end of the section 4. For the purpose of moving the feeder from place to place, it is preferably mounted on wheels.

7 is an axle extending transversely across the section 4 of the feeder relatively near the hinged end thereof, and is secured in place in any suitable manner. Upon this axle are mounted the carrying or truck wheels 8, 8. Besides serving to permit the feeder to be transported readily from place to place, these wheels maintain the rear end of the feeder section 4 at a fixed distance above the ground, and consequently keep the hinged end of the section 5, at all times elevated above the ground.

The feeder section 4 preferably consists of a platform or table-like part 4′, extending from the front to the rear of the section. At either side of this table or platform are vertical side boards 4ᵃ, and on top of these side boards 4ᵃ are placed boards 4ᵇ, arranged to flare outwardly from the platform 4′, in order to make the structure trough-like in transverse cross section. The boards 4ᵃ and 4ᵇ, at either side of the structure, may be secured together by means of angle bars 4ᶜ rigidly secured thereto. The upper or rear folding section 5 of the feeder is preferably constructed in a manner similar to the lower section 4, it having the platform or table-like part 5′, the side boards or plates 5ᵃ and the outwardly flared boards or plates 5ᵇ secured to the plates 5ᵃ.

9 indicates an endless conveyer mounted upon and adapted to travel about the sections 4 and 5 of the feeder. Preferably this main conveyer consists, as shown, of a plurality of transverse bars or rods 10 arranged in series and uniformly spaced apart, and each secured at either end to one of the endless chains 10', 10', arranged at either side of the conveyer. At their lower ends these chains run over and are guided by sprocket wheels 11, 11, secured on a transversely arranged shaft 12 which is mounted in bearings 13 carried in the bearing plates or blocks 14, 14, secured to the lower ends of the boards or plates 4ᵃ. These bearings 13 are preferably adjustable in their bearing blocks, the blocks being slotted as indicated at 14' to receive the bearings, and each bearing having an adjusting screw or bolt extending therefrom outward through a plate 14ᵃ secured to the outer end of the bearing block 14. 14ᵇ are springs encircling the said adjusting bolts on the outside of the said plates 14ᵃ, and 15 are nuts fitted to the said bolts and adapted to adjust the bearings 13 into position within their respective bearing blocks 14 against the pressure of the springs 14ᵇ. It will be noted that the springs 14ᵇ allow for a certain forward and rearward play of the bearings 13 in order to compensate for uneven strains to which the conveyer 9 may be subjected.

At the hinged end of the section 4 the upper flights of the endless chains 10', 10' are held down so as to maintain the scrapers or bars 10 of the conveyer in proper superposed relation closely adjacent to the platform 4' by means of guides 10ᵃ secured to the side plates 5ᵃ. At the free end of the section 5 these chains are carried around and guided by the driving sprockets 16 arranged at either side of the conveyer and secured to the transverse shaft 17 mounted in bearings 18, 18, secured to the plates or boards 5ᵃ at either side of the free end of the section 5. In order to permit the folding of the upper sections, I have provided detachable plates or boards 5ᶜ each of which is at one end adapted to aline with one of the flaring sideboards 5ᵇ of the upper section and at its other end with the side board 4ᵇ of the lower section. The ends of these detachable plates may be held in position by guides 4ᵈ, 5ᵈ, carried by the boards 4ᵇ, and 5ᵇ, respectively. Near its center each detachable plate carries a downwardly extending pin or bar 5ᵉ adapted to enter the clips or guides 5ᶠ carried by the plates 5ᵃ.

6' are double acting springs, each secured at one end to one of the boards 4ᵃ and at its other end to one of the boards 5ᵃ. These springs act in the well known manner to hold the sections yieldingly in relation to each other in either their folded or unfolded positions.

The shaft 17 extends for some distance beyond the side plates or bars 5ᵃ at either side of the feeder section 5. To one of these extended ends a belt pulley 19 is rigidly secured. This pulley is adapted to be connected by means of a belt 19' to a driving pulley 19ᵃ on the threshing machine. From the free end of the section 5 there is supported a supplemental conveyer 20, or carrier, adapted to coöperate with the main conveyer 9 to advance the grain and straw upwardly along the table 5ᶠ and to deliver it to the band cutting and feeding mechanism. This supplemental conveyer or carrier 20 preferably has a frame comprising parallel side bars 20', 20', spaced apart and held in position relative to each other in any suitable manner. This framework is supported in fixed position relative to the free end of the feeder section 5 by means of the supports or braces 21. These supports are preferably made of metal bars bowed or curved outwardly at 21' between the plates or boards 5ᵃ, 5ᵃ, of the feeder section 5, and the side plates 20' of the supplemental carrier, and at either end of this bowed portion the bars are straightened out, flattened and rigidly secured at one end to one of the plates 5ᵃ, and at the other end to the plate 20', which is substantially in the same vertical plane with it. The braces are bowed or curved outward, as indicated at 21', in order to insure that they will not interfere with the masses of straw and grain conducted upwardly between the main conveyer of the feeder and the supplemental carrier when they are in operation and to escape the outwardly flared walls 5ᵇ of the upper section.

22 is a transversely arranged shaft mounted in bearings carried by the plates 20', 20', adjacent to the ends at which they are supported by the standards or braces 21. To this transverse shaft is secured a roller 23.

24 is a roller carried by a shaft 25 mounted in suitable bearings in the side plates 20', 20' of the supplemental conveyer at their free ends and 26 is an endless conveyer belt mounted upon and adapted to travel about the rollers 23 and 24. Preferably this belt is provided at regular intervals with transversely arranged slats or bars 26'.

The support for the free end of the supplemental conveyer 20 is obtained through rigid brace bars or arms 21ᵃ, 21ᵃ arranged at substantially right angles to the side plates 20' of the supplemental conveyer. These supporting bars I arrange adjacent to the forward or delivery end of the supplemental conveyer, and are represented as being extensions of the bars 21, though this is a mere convenient detail of construction. The outer ends of these arms are connected by rods 27, 27 with the free ends of the side plates 20', said connections being preferably adjustable so as to allow for taking up slack or play in the connecting rods, when desired. The feed belt of the supplemental conveyer is so driven that its lower run travels in the same direction as that portion of the upper run of the main conveyer that lies adjacent and opposite thereto.

To operate the supplemental conveyer power is applied to the drive shaft 22 carrying the roller 23 through a gear wheel 28 carried by the shaft 17 at its opposite end from the belt pulley 19. This gear 28 meshes with and drives a gear 29 rigidly secured to a countershaft 30 mounted in a bearing secured to the adjacent side of the feeder section 5. The shaft 30 has secured to its outer end a sprocket wheel 29'. 32 is a sprocket wheel rigidly secured to the end of the shaft 22 in the vertical plane of the sprocket wheel 29'. 33 is an endless driving chain connecting the sprockets 29' and 32 together.

34 is a transverse cross bar secured to the front free end of the feeder section 4. It is preferably connected thereto as shown, so as to lie in a horizontal plane beneath the side bars or plates 4ª, and it preferably extends forward beyond the front ends of said side plates.

35 is a curved bar secured to the cross bars 34 and adapted to be used for connecting the feeder to the rear end of the threshing machine for drawing it from place to place.

In operation, section 5 is unfolded into the position shown in Fig. 1, the feeder mechanism is then placed so that its conveyers are in alinement with the conveyer of the band cutter and feeder and it is then moved up to the front end of the band cutter and feeder and secured thereto by any suitable means, the upper flight of the main conveyer on the section 5 being arranged to lie closely adjacent to the upper side of the conveyer for the band cutter and feeder and at the front end thereof. The free end of the section 4 is permitted to bear upon the ground, the cross bar 34 serving as the rest for this purpose. When it is desired, a stake or bar may be driven into the ground in the open space between the cross bar 34 and the curved part of the bar 35, in order to secure the feeder structure from moving relative to the threshing machine. The belt 19' is then placed in position connecting the belt pulley 19 with its driving pulley 19ª on the threshing machine, and power is applied for operating the conveyers on the feeder. This operation will be readily understood; the grain is thrown on the conveyer 9 at a point near the ground and by it carried to the threshing machine. As it starts up the relatively steep incline between the section 5 and the supplemental conveyer 20, both the main and supplemental conveyers operate to advance it, the upper one tending also to press any straw which has a tendency to rise away from the section 5 downward and to assist in delivering the straw or straw bundles to the front end of the band cutting and feeding mechanism in a stream of substantially uniform thickness. After the threshing has been finished the section 5 of the feeder 1 may be disconnected from the band cutting and feeding mechanism on the threshing machine, and may be folded forward about the hinge 6.

36, 36 are supporting rods or standards for the section 5 when it is in folded position relative to the section 4. These rods are preferably mounted upon and carried by the axle 7, one being arranged at either side of the feeder structure within the wheels 8, 8. At their free ends these standards are forked as indicated at 36' and adapted to receive between their prongs or arms the shaft 17 at the free end of the section 5. As shown in Fig. 6, they tend to brace and support the feeder section 5 and to prevent its swinging downward relative to the section 4 beyond a predetermined point. When the feeding mechanism is in use these rods may be swung down out of the way and along the side of the side plates or bars 5ª, 5ª, as shown in Fig. 1. I have also found it desirable to provide additional support for the free end of the supplemental conveyer 20, when the section 5 is folded, as shown in Fig. 6. This support or suspension may be obtained through straps 37 secured to the sides of the section 5, and also to the supplemental conveyer frame at its free end.

It will be noted that I have provided a feeder, the grain and straw receiving end of which is relatively low so that the material to be threshed may be readily and easily pitched onto it. Such a construction I have found to possess numerous advantages for the rapid and efficient handling of grain and straw and I believe the mechanism to be peculiarly adapted for efficiently threshing off from stacks in which the grain is relatively loose.

What I claim is:—

1. In a feeder for threshing machines, the combination of an endless conveyer having a receiving section the end of which is arranged to be brought close to the ground and a relatively short delivery section, such sections being pivotally united and the latter foldable over the former, and a pair of supporting wheels for the conveyer connected with the receiving section near the end that is pivotally united with the delivery section, substantially as set forth.

2. In a feeder for threshing machines, the combination of an endless conveyer having a relatively long receiving section the end of which is arranged to be brought close to the ground, and a relatively short upwardly inclined delivery section, such sections being pivotally united, and the delivery section being foldable over the receiving section, and a pair of supporting wheels connected with the receiving section near the end that is pivotally united with the delivery section, substantially as set forth.

3. In a portable feeding conveyer for threshing machines, the combination of an endless conveyer comprising upper and lower sections, said lower section being adapted when in operative position to be inclined to the horizontal and to have its front or straw and grain receiving end held relatively close to the ground, and said upper section being adapted to be inclined when in operative position at a relatively greater angle to the horizontal than said lower section, and to connect with the feeder of the threshing apparatus, a supplemental conveyer arranged adjacent to the upper section of the said endless conveyer near its delivery end and adapted to coöperate therewith to advance the straw and grain, a pair of ground wheels upon which the lower section is mounted, and means for connecting the receiving end of the conveyer to draft devices.

4. In a portable feeder for threshing machines, the combination of an endless conveyer having a lower receiving section, having at its end a draft attachment, and an upper section inclined upward relative to the receiving section and arranged to deliver to the threshing machine and a support for the feeder comprising a pair of ground wheels arranged adjacent to the end of the receiving section that connects with the delivery section, said sections being pivotally united, and the delivery section arranged to fold relative to the receiving section, substantially as set forth.

5. In a feeder of the class described, an endless conveyer having a lower section and an upper section adapted to be folded relative thereto, a support for said sections having ground wheels arranged adjacent to the axis about which the said upper section is folded, and a supplemental conveyer adapted to coöperate with the upper section of said endless conveyer and to be folded therewith.

6. In a portable feeding conveyer for threshing machines, the combination of an endless conveyer having a lower section, an upper section adapted to connect with the feeder of the threshing apparatus and constructed to fold relative to the lower section, a supplemental conveyer adapted to coöperate with the upper section of said endless conveyer, means for actuating the endless conveyer, power transmitting devices interposed between the endless conveyer and the supplemental conveyer for operating the latter, a pair of ground wheels upon which the lower section is mounted, and means for connecting the receiving end of the conveyer to draft devices.

7. In a feeder of the class described, an endless conveyer having a lower section, an upper section adapted to be folded relative to the lower section, a supplemental conveyer adapted to coöperate with the upper section of said endless conveyer and to be folded therewith, means for actuating said endless conveyer and power transmitting devices interposed between said endless conveyer and said supplemental conveyer for actuating the latter.

8. In a feeder of the class described, a main endless conveyer having a lower section, and an upper section inclined to the lower section, and endless supplemental conveyer having one of its runs arranged to coöperate with the upper run of the upper section of said main endless conveyer to advance the grain and straw, means for actuating said main endless conveyer, and means interposed between said main endless conveyer and said supplemental conveyer adapted to cause the said coöperating run of the supplemental conveyer to travel in the same direction as the upper run of the main endless conveyer.

9. In a feeder for threshing machines, the combination of a front lower platform section, a rear upper inclined platform section hinged to the front platform section and arranged to be folded relative thereto, an endless conveyer arranged to travel around the said platform sections to advance the grain and straw rearward thereon and having that portion of it which travels about the upper platform section foldable therewith, and a supplemental conveyer arranged above and parallel with the said rear upper inclined platform section.

10. In a feeder of the class described, the combination of a front platform section adapted to be inclined to the horizontal and to have its front or grain and straw receiving end held relatively close to the ground, a rear platform section hinged to the front platform section and adapted to be folded relatively thereto and when in operative position to be inclined to the said front section, and a supplemental conveyer coöperating with said straw and grain advancing means to advance the straw and grain along the said rear platform section when it is in operative position.

11. A portable feeding conveyer for threshing machines comprising in combination a receiving section and a delivery section arranged end to end and the latter inclined upwardly with respect to the former, and adapted to connect with the feeder of the threshing apparatus; a pair of ground wheels upon which the receiving section is mounted, and means for connecting the receiving end of the conveyer to draft devices.

12. In a feeder for threshing machines, the combination of a relatively long receiving platform section, a relatively short delivery platform section arranged to be folded over the said long platform section and to be inclined thereto when in operative position, said relatively long receiving platform section being adapted to rest at its front free end upon the ground, means for advancing grain and straw along said platform sections and supporting wheels for said mechanism connected with said relatively long platform section near the end thereof to which is connected the said delivery platform.

13. In a feeder of the class described the combination of a front lower receiving section, a rear delivery section pivotally connected to the front section and arranged to be folded relative thereto, means for supporting the feeder comprising an axle and a pair of wheels, these being carried by the front section, and means supported near the axis of said wheels for supporting the free end of the said rear delivery section when in its folded position.

14. The combination with the band cutting and feeding mechanism of a threshing machine, of a lower platform section, an upper platform section hinged to the lower platform section, adapted to be folded relative thereto and to be connected to the front end of said band cutting and feeding mechanism, a main endless conveyer adapted to travel about said platform sections, a supplemental conveyer adapted to coöperate with said main conveyer to advance and deliver grain and straw to said band cutting and feeding mechanism, and power transmitting devices interposed between a power driven element on said threshing machine and said conveyers for actuating the conveyers.

15. A portable feeding conveyer for threshing machines comprising in combination moving conveyer parts for advancing the straw and grain along right lines to the feeding and threshing apparatus, a supporting frame for said moving parts, a pair of ground wheels upon which the frame is mounted intermediate its ends, the delivery end of the conveyer being adapted to connect with the feeder of the threshing apparatus, and means for connecting the receiving end of the conveyer to draft devices.

16. A portable feeding conveyer for threshing machines comprising in combination moving conveyer parts for advancing the straw and grain to the feeding and threshing apparatus along lines longitudinal of the threshing machine, a supporting frame for said moving parts, a pair of ground wheels upon which the frame is mounted intermediate its ends, the delivery end of the conveyer being adapted to connect with the feeder of the threshing apparatus, and means for connecting the receiving end of the conveyer to draft devices.

17. In a portable conveyer for threshing machines the combination of a conveyer having a lower receiving section provided at its end with a draft attachment, an upper section inclined upward relative to the receiving section and arranged to deliver to the threshing machine, and a support for the conveyer comprising a pair of ground wheels upon which the receiving section is mounted, said receiving and delivery section being pivotally united, and the delivery section arranged to fold upon the receiving section, substantially as set forth.

18. A portable feeding conveyer for threshing machines comprising in combination a receiving section and a delivery section arranged end to end, said sections being pivotally united, and the delivery section being foldable over the receiving section and a pair of ground wheels upon which the receiving section is supported, said wheels being disposed at points beneath the delivery section when in folded position.

19. A portable feeding conveyer for threshing machines comprising in combination a receiving section and an upwardly inclined delivery section, said sections being arranged end to end and pivotally united to permit the delivery section to fold over the receiving section, and a pair of ground wheels upon which the receiving section is supported, said wheels being disposed at points beneath the delivery section when in folded position.

In testimony whereof I affix my signature, in presence of two witnesses.

THOMAS E. MAHONEY.

Witnesses:
ALBERT L. GILHAUSE,
WM. J. STROBEL.